United States Patent [19]

Landi

[11] Patent Number: 5,122,405
[45] Date of Patent: Jun. 16, 1992

[54] SHOCK ABSORBING MEANS FOR SPORTING EQUIPMENT HANDLES

[75] Inventor: Curtis L. Landi, Mountain View, Calif.

[73] Assignee: Supracor Systems, Inc., Sunnyvale, Calif.

[21] Appl. No.: 625,502

[22] Filed: Dec. 11, 1990

[51] Int. Cl.⁵ .............................................. B32B 3/12
[52] U.S. Cl. ......................................... 428/116; 428/72; 428/118; 273/67 A; 273/73 C; 273/73 D; 273/73 F; 273/73 G; 273/73 J; 273/81 R
[58] Field of Search ............... 273/73 C, 73 D, 73 F, 273/73 H, 73 J, 75, 81 R, 67 A, 73 K; 428/116, 118, 71, 72, 73, 37

[56] References Cited

U.S. PATENT DOCUMENTS

| 3,879,035 | 4/1975 | Danchulis | 273/73 C |
| 4,042,238 | 8/1977 | Theriault | 273/73 C |
| 4,175,745 | 11/1979 | Gevers | 273/73 C |
| 4,357,013 | 11/1982 | Fernandez | 273/73 F |
| 4,836,543 | 6/1989 | Holzer | 273/73 D |
| 5,039,567 | 8/1991 | Landi | 428/116 |

FOREIGN PATENT DOCUMENTS

2225538 6/1990 United Kingdom ............... 273/73 J

Primary Examiner—Ellis P. Robinson
Assistant Examiner—Nasser Ahmad
Attorney, Agent, or Firm—Rosenblum, Parish & Isaacs

[57] ABSTRACT

A shock absorbing filler for hollow sporting equipment that will absorb vibrations generated during use of said equipment. An elongated block of thermoplastic elastomeric honeycomb, either bare, singly faced or doubly faced, is packed within the hollow handle or hollow throat of an item of sporting equipment. The honeycomb block expands within said hollow core to provide a vibration dampening interface.

16 Claims, 9 Drawing Sheets

SHOCK ABSORBING MEANS FOR SPORTING EQUIPMENT HANDLES

BACKGROUND OF THE INVENTION

1. Field of the Invention

This invention relates generally to means for absorbing and dispersing shock in sporting equipment, and specifically to the use of shock absorbing material contained within the handle of hand-held sporting equipment.

2. Brief Description of the Prior Art

In many sports, hand-held equipment such as rackets, golf clubs, hockey sticks and bats are used to strike a ball or a puck, as the case may be. When the equipment is caused to strike the projectile, vibrations are produced in the equipment which radiate up the shaft to the hand and arm of the player. Prolonged exposure to these vibrations can cause injury to the player's hand, wrist and arm. Therefore, it is desirable to eliminate or at least reduce such vibrations before they reach the handle of the equipment.

The shaft of a piece of sporting equipment, for example a tennis racket, stems from the head of the racket and projects into, and is encased by, the handle portion of the racket. Vibrations, generated upon striking a ball, radiate from the head of the racket to the throat, through the shaft and onto the handle. Dampening the vibrations that flow through the string diaphragm of the racket causes the player to experience a flat feeling, or a deadness in the hit. Therefore, the throat and shaft are ideal locations for dampening the shocks before they reach the hand and arm of the player. This allows the player to experience a liveness upon striking a ball while still reducing the damage to his/her arm.

SUMMARY OF THE INVENTION

It is therefore an objective of the present invention to provide means to dampen vibrations induced in hand-held sporting equipment during use, comprising a block of thermoplastic elastomeric honeycomb material.

Another objective of the present invention is to provide vibration dampening means by inserting honeycomb material within the shaft of an item of sporting equipment.

A further objective of the present invention is to provide vibration dampening means by inserting at least one block of honeycomb material within the hollowed out throat section of a game racket.

Briefly, a preferred embodiment of the present invention includes an elongated block of thermoplastic elastomeric honeycomb that has been inserted into a hollow in the shaft of an item of hand held sporting equipment such as a tennis racket. The honeycomb block absorbs shocks and dampens the vibrations that flow through the shaft from the head of the racket to the handle. The shock absorbing characteristics of the block result from the encapsulation of air within the honeycomb core of the block, and also from the vibration dampening nature of the thermoplastic material used to make the block.

An important advantage of the present invention is that the honeycomb block is made of thermoplastic and thermoplastic elastomeric materials which dampen vibrations.

Another advantage of the present invention is that the material used for the honeycomb block is lightweight, a desirable feature for use with sporting equipment.

A further advantage of the present invention is that the thermoplastic material is highly durable and remains an effective shock dampener even with repeated use.

Another advantage of the present invention is that the means for absorbing vibrations are disposed internally, within the shaft or frame of the equipment, and therefore will not interfere with the normal use of the equipment.

These and other objects and advantages of the present invention will no doubt become apparent to those skilled in the art after having read the following detailed description of the preferred embodiment which is contained in and illustrated by the various drawing figures.

DETAILED DESCRIPTION OF THE PREFERRED EMBODIMENT

Figure 1:
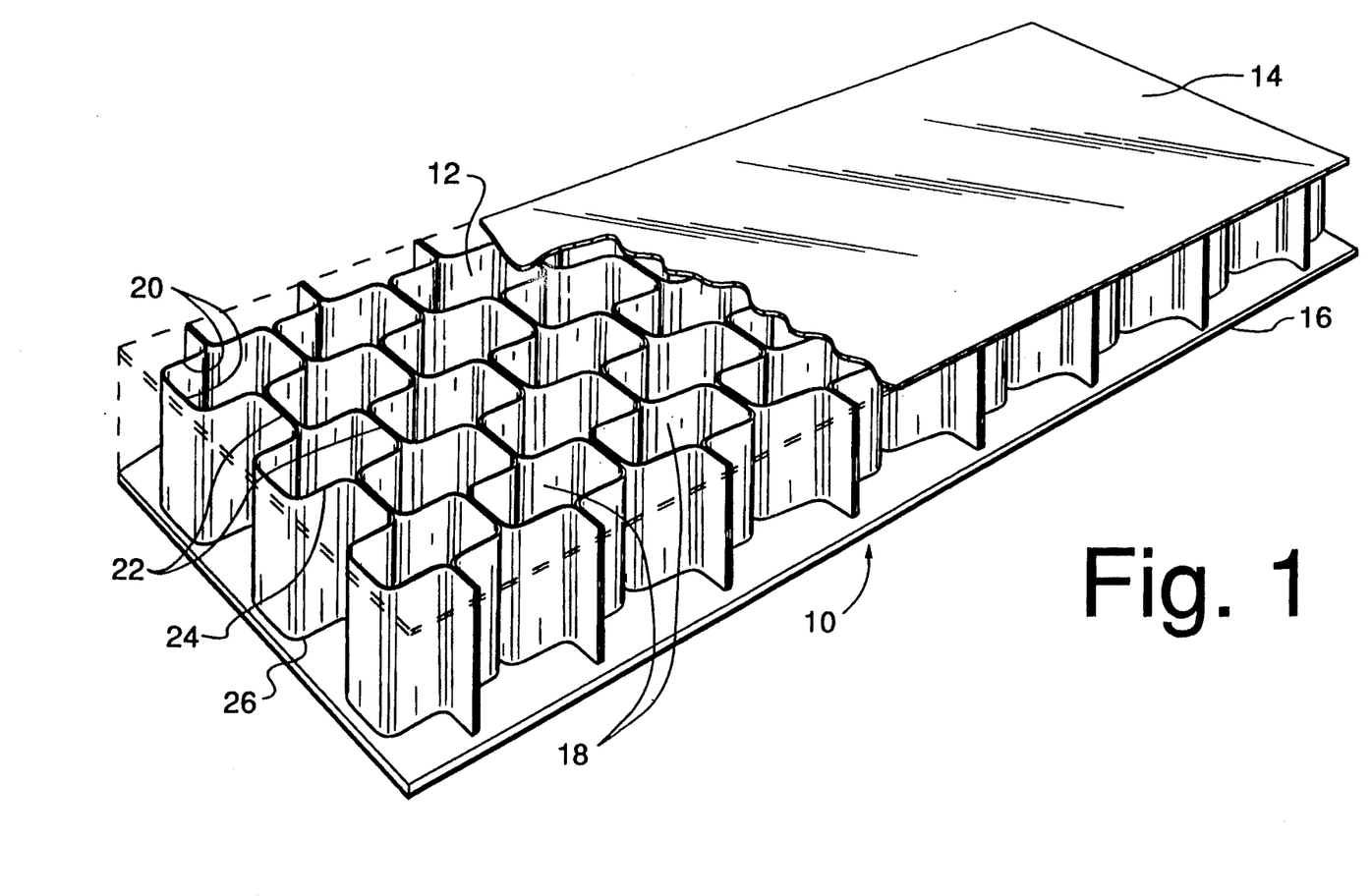
FIG. 1 is a perspective view of the shock absorbing honeycomb of the present invention.

FIG. 1 illustrates a preferred embodiment of a block of shock absorbing honeycomb 10 in accordance with the present invention. The core 12 is made from vibration absorbing thermoplastic elastomeric material that has a honeycomb construction. Two transparent thermoplastic facings 14 and 16 are shown, although, in alternative embodiments, none (or only one) need be used.

The honeycomb core 12 is made from sheets of an advanced grade thermoplastic elastomeric material that are compression bonded together at intermittently spaced intervals staggered between alternate sheets. This pattern of bonding creates a honeycomb network of elongated, generally hexagonally shaped cells when the bonded stack of sheets is expanded.

Each cell 18 of the honeycomb core 12 is defined by four generally S-shaped wall segments, each of which is shared by an adjacent cell. The wall segments of each cell 18 include single thickness wall portions 20 and double thickness wall portions 22, the latter portions being disposed on each side of the cell where the side wall of one cell is compression bonded to the side wall of an immediately adjacent cell.

The upper and lower extremities of the walls forming the several cells are deformed during a planarization operation disclosed in our copending U.S. patent application Ser. No. 07/446,320 (now U.S. Pat. No. 5,039,567) filed Dec. 4, 1989, and create upper and lower surfaces 24 and 26 of the honeycomb core. Facings 14 and 16, made from a resilient thermoplastic material, are then compression bonded to the top and bottom surfaces 24 and 26, while the core is held in an expanded configuration. The addition of the facings encapsulates air within each cell.

The honeycomb block's superior shock absorption characteristics result in part from the use of encapsulated air as well as the use of thermoplastic (or thermoplastic elastomeric materials) for both the honeycomb core 12 and the facings 14 and 16. Other favorable characteristics of the honeycomb block 10 include durability and tear resistance.

While the honeycomb block 10 is tear resistant and highly durable, it is also extremely lightweight. Bare honeycomb (without facings) is 93% air, and is lighter than the foams normally used to pack the racket shaft. Even with the facings attached, the weight of the honeycomb compares favorably with that of the foams.

Figure 2A:
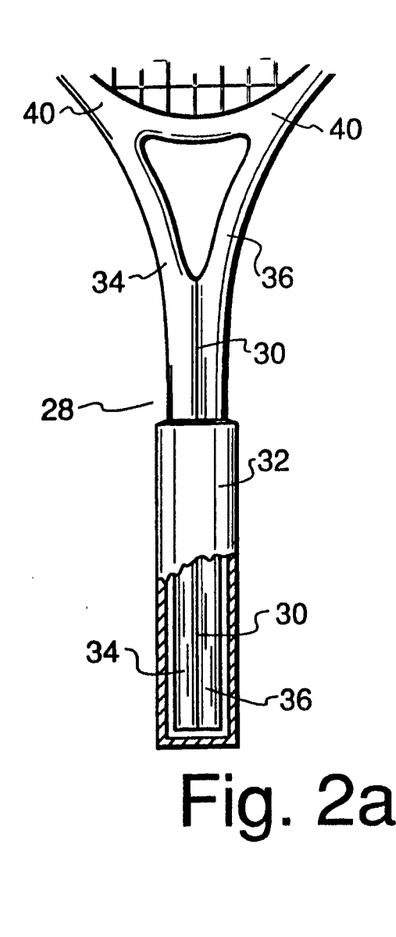
FIG. 2a is a front view of a partial tennis racket with a portion of the handle broken away showing the protrusion of the shaft through the racket handle.

FIG. 2a is a front view of a tennis racket 28 partially broken illustrating how the shaft 30 of the racket protrudes into the length of the racket handle 32. The shaft 30 of the racket 28 consists of two tubes 34 and 36 that are placed side by side. At the base 42 of the racket frame 40, the tubes 34 and 36 separate and integrate into the racket frame 40, each tube to one side thereof. The lower half of the shaft 30 is encased in a handle 32.

Figure 2B:
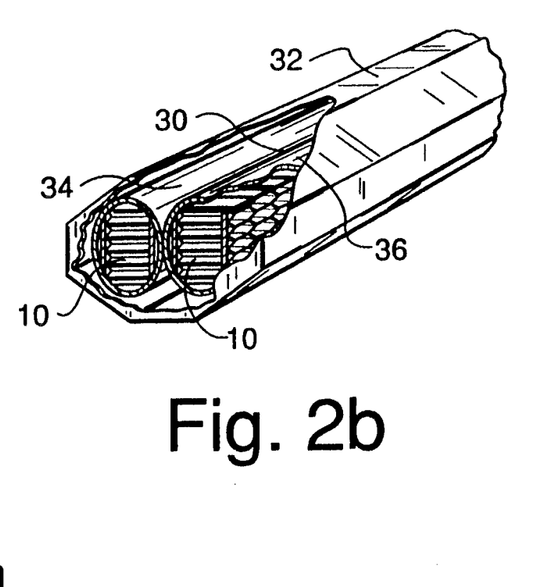
FIG. 2b is a perspective view of a partial racket handle whose encasement has been broken away to show the disposition of the shaft within the handle; the shaft has also been broken away to illustrate the placement of the shock absorbing honeycomb within the shaft.

FIG. 2b shows how a block of shock absorbing honeycomb 10 is placed within the hollow shaft 30 of the tennis racket 28. A partial tennis racket handle 32 is shown broken away to reveal the encased shaft 30. One tube 36 of the shaft is also partially broken to illustrate how the shock absorbing block 10 is disposed within the hollow tubes of the shaft.

Figure 3:
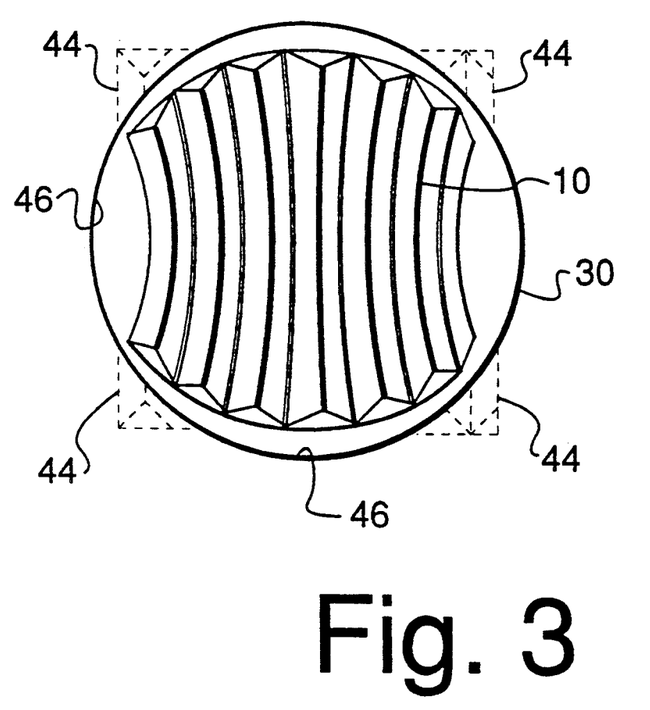
FIG. 3 is a front view of one tube of the shaft illustrating how the oversized block of honeycomb conforms to and presses against the inner walls of the tube.

FIG. 3 is a front view of one tube 36 of a shaft 30 showing how the block of honeycomb 10 is situated within the hollow center of the tube. The honeycomb block is compressed and inserted into the tube, then allowed to expand outwardly against the inner walls 38 of the tube. The honeycomb block's restricted expansion due to the diameter of the tube forces the block 10 to remain stationary within the tube 36, and also provides a vibration dampening interface between the tube walls 38 and the block of honeycomb. The dashed lines 44 represent the full size of the block of honeycomb 10 when allowed to expand unrestricted.

During play, vibrations are produced in the racket where the racket comes in contact with the ball. These vibrations radiate up the shaft 30 of the racket 28. The honeycomb block 10 within the shaft 30 will dampen these vibrations. The thermoplastic elastomeric material that the block 10 is made from has inherent vibration dampening characteristics. In addition, where the block 10 is faced on both sides, air is encapsulated within each whole cell. This air aids in absorbing the vibrations experienced by the shaft 30.

Figure 4A:
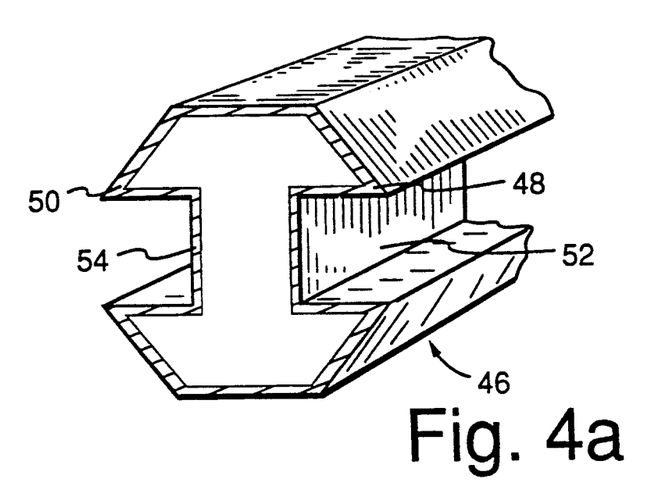
FIG. 4a is a perspective view of an alternative embodiment illustrating a partial tennis racket handle having deep troughs carved out of two sides of the handle, in which the vibration dampening material is embedded.

FIG. 4a is an alternative embodiment of a tennis racket handle. In this illustration, a partial tennis racket handle 46 is shown having two deep, channels 52 and 54; one channel carved out of one side 48 of the handle and the other channel disposed on the opposite side 50 thereof. Vibration absorbing honeycomb is placed within these troughs and dampens the shocks created during play. The placement of the honeycomb is further discussed in FIG. 4b.

Figure 4B:
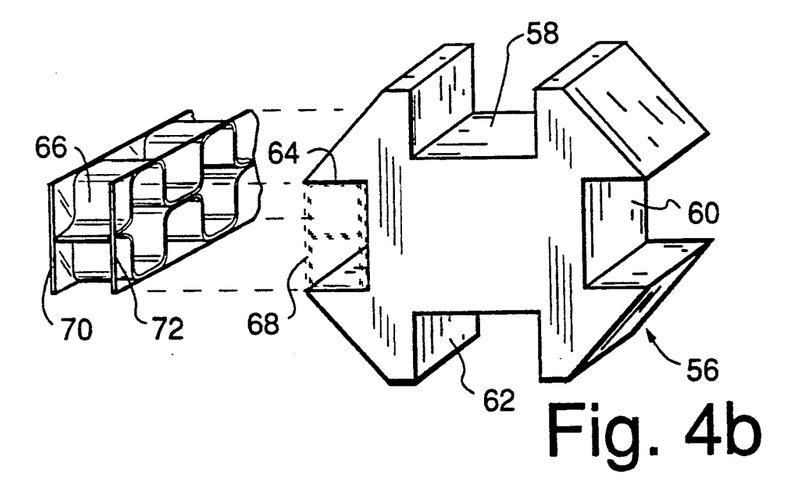
FIG. 4b is also a perspective view of an alternative embodiment, but illustrating shallow channels on alternating sides of an octagonal tennis racket handle to create a fluted effect.

FIG. 4b illustrates another alternative embodiment of a tennis racket handle. Channels 58, 60, 62 and 64 are disposed on alternating sides of an octagonal tennis racket handle 56. Shock dampening honeycomb strips 66 are disposed within the fluting to absorb the vibrations flowing through the racket handle during use of the racket. The correlation lines in the figure show the relationship of a strip of honeycomb 66 and a trough 64.

The dashed lines 68 indicate the positioning of the honeycomb strip 66 within the channel 64. As illustrated, the honeycomb strip includes two facing sheets 70 and 72. The strip 66 is disposed within the trough such that the facing sheet 70 is parallel with the open plane of the trough 64. Alternatively, the strip can be positioned 90 degrees to the first disposition, wherein the facing sheets would be parallel with the sides of the channel.

Figures 5A, 5B:
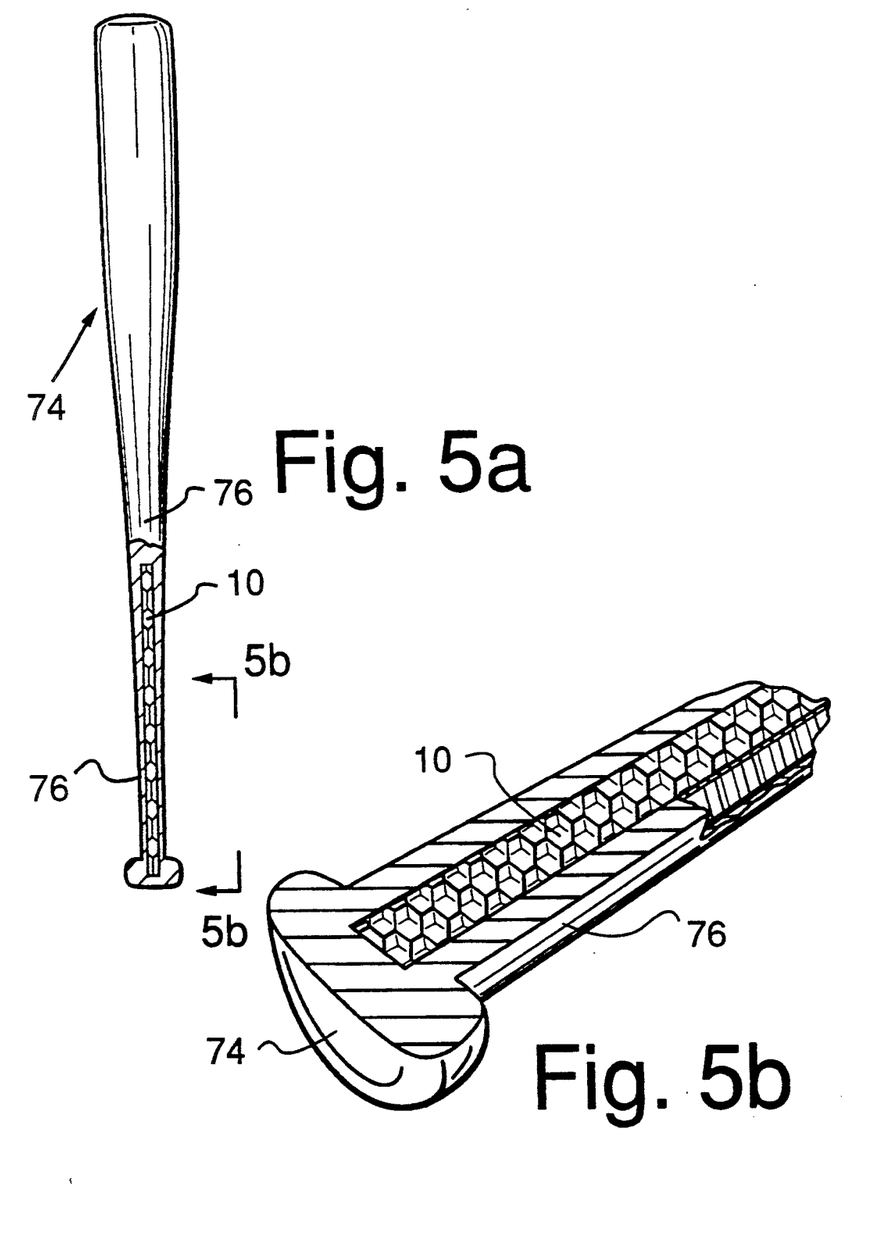
FIG. 5a is a front view of a baseball bat whose handle has been partially broken away to show the placement of the shock absorbing honeycomb block within the heart of the handle.
FIG. 5b is a sectional view, taken along line 5—5 of FIG. 5a, in perspective of a partial baseball bat handle containing shock absorbing honeycomb, with the bat partially broken away to show the depth of the block of honeycomb.

FIG. 5a illustrates a further alternative embodiment. A baseball bat 74 is shown with its handle 76 partially broken away to reveal the shock absorbing block 10 within the heart of the handle 76. In this figure, the honeycomb block 10 is only placed within the handle 76 portion of the bat. In an alternative embodiment, the block would extend through the full length of the bat.

FIG. 5b is a section of a partial bat handle 76, taken along the line 5—5 of FIG. 5a, shown in a perspective view. A portion of the bat 74 is shown broken away to illustrate the placement and depth of the honeycomb block 10. The bat 74 in this figure is generally solid, hollowed only at its very center along the longitudinal axis of the bat. The honeycomb block 10 fills the internal hollow of the bat.

In an alternative embodiment, a non-solid bat, such as an formed aluminum bat, can also benefit from the addition of an elongated block of shock absorbing honeycomb within its center. In hollow bats, the honeycomb block would plug the entire internal cavity.

Similar to the sporting equipment illustrated in the figures, other types of sports rackets, clubs, bats and sticks might benefit from the addition of a shock absorbing honeycomb core. Some examples are racquetball rackets, golf clubs, and hockey sticks. Even in bicycle handlebars, where the equipment is not used to strike an object, vibration dampening means contained within the hollow center of the handlebar will relieve the bike rider of objectionable vibrations.

Figure 6A:
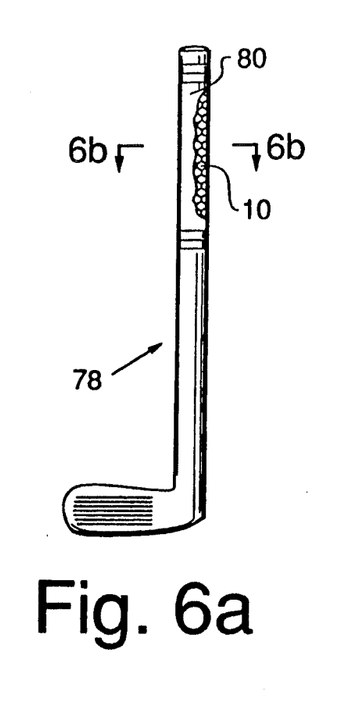
FIG. 6a is a front view of a hockey stick whose handle is partially broken to illustrate the placement of the honeycomb material.

Further, the honeycomb shock absorbing material need not only be in block form. FIG. 6a illustrates a hockey stick 78 partially broken showing vibration absorbing honeycomb 10 within the handle portion 80.

Figure 6B:
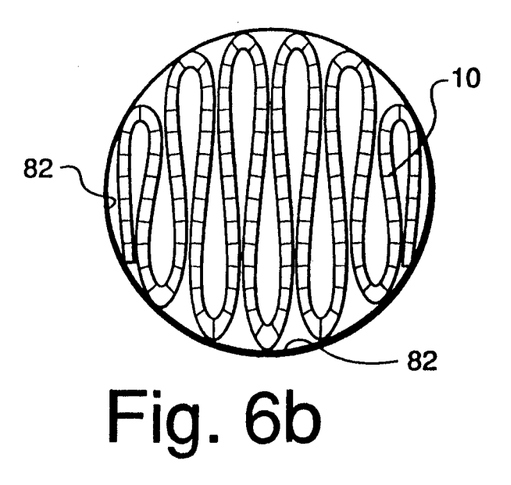
FIG. 6b is a cross sectional view of the hockey stick handle of FIG. 6a, taken along lines 6—6, showing a folded configuration of honeycomb material as an alternative embodiment to a block of honeycomb.

FIG. 6b is a cross sectional view of the hockey stick 78 of FIG. 6a, taken along the line 6—6, illustrating an alternative configuration of the honeycomb 10 filler. As opposed to a block form, the honeycomb 10 in this figure has been folded fan-style, compressed and placed within the handle portion 80 of a hockey stick 78. The folded material expands and conforms to the inner construction of the stick handle, and holds itself in place by pressing outwardly against the inner walls 82 of the stick handle 80.

Figure 7A:
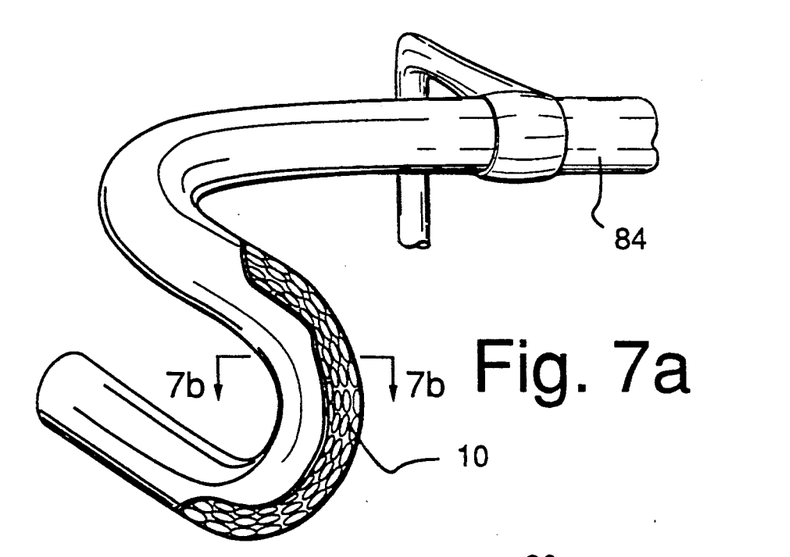
FIG. 7a is a perspective view of a set of bicycle handlebars partially broken to show shock absorbing honeycomb within the hollow core of the handlebars.

FIG. 7a is a perspective view of a pair of bicycle handlebars 84 partially broken to reveal the honeycomb vibration dampening material inside. The material fills the entire length of the bars.

Figure 7B:
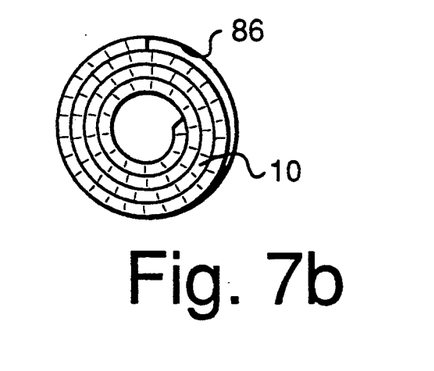
FIG. 7b is a cross sectional view of the handlebars of FIG. 7a, taken along the lines 7—7, illustrating rolled honeycomb as an alternative embodiment to a block of honeycomb.

FIG. 7b is a cross sectional view of the handlebars 56 in FIG. 7a, taken along the line 7—7, showing an alternative configuration of the honeycomb 10. Here, the honeycomb 10 is first rolled tightly, inserted into the hollow center of the handlebars 84 and then released. Upon release, the rolled honeycomb 10 will expand until it is pressing against the inner walls 86 of the handlebars 84 to create a vibration dampening interface therewith.

Figure 8:
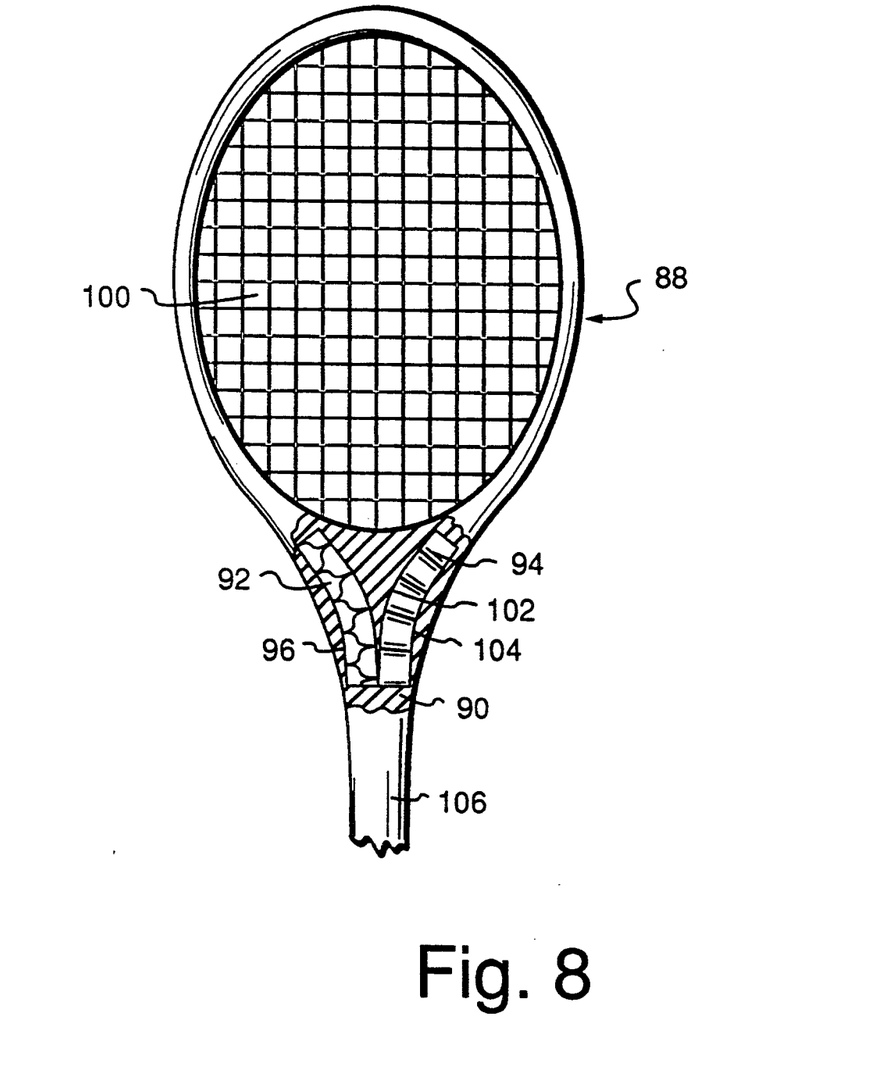
FIG. 8 is a partial front view of a tennis racket with a portion of the throat section broken away showing the disposition of the honeycomb material.

FIG. 8 illustrates an alternative embodiment of a tennis racket 88 having shock absorbing honeycomb contained within the throat section 90 of the racket. As illustrated, a partial wooden tennis racket 88 is shown, broken away at the throat section 90 to reveal the internal dampening means. Two blocks of honeycomb 92 and 94 are disposed within cavities in the center of the racket's throat 90. Although two blocks are illustrated, only one need be used. The blocks of honeycomb 92 and 94 are shown in different positions to illustrate placement alternatives. Honeycomb block 92 is positioned such that the facing sheets 96 and 98 (98 not shown) are lying in a plane parallel with the plane of the string diaphragm 100. The second block of honeycomb 94 is alternatively positioned, 90 degrees from the first block, where the facings 102 and 104 are lying in a plane that is normal to the plane of the string diaphragm 100. By placing honeycomb in the throat of the racket, vibrations emanating from the string diaphragm 100 are dampened before they reach the shaft 106 of the racket.

Figure 9:
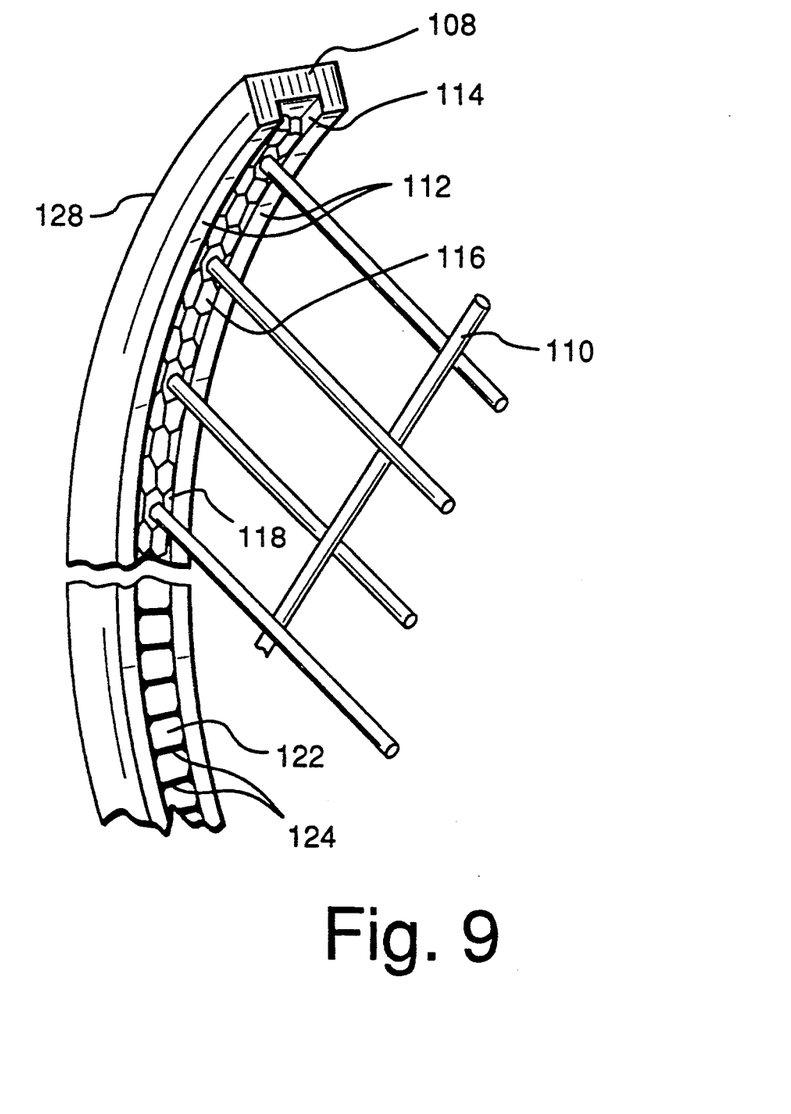
FIG. 9 is a perspective view of a partial tennis racket frame revealing how a strip of honeycomb can be embedded into the frame to dampen vibrations.

FIG. 9 illustrates how a strip of honeycomb can be embedded within the frame of a racket. In the figure, a partial tennis racket frame 108 is shown as well as a part of the string diaphragm 110. On the inside wall 112 of the frame, a trough 114 is cut away and a length 116 of flexible honeycomb is disposed within the trough 114. The honeycomb can be positioned so that the facing sheet 118 is exposed at the opening of the trough 114, or 90 degrees thereto - where a side 122 of the honeycomb, having the cut cell walls 124, is exposed at the opening of the trough 114.

The strings 126 of the string diaphragm 110 normally pierce the frame and are secured thereto on the outer wall 128 of the frame. This configuration remains the same when a honeycomb-filled trough is built into the frame. The strings pierce through the facing sheets 118 and 120 (facing sheet 120 is not shown) and continue through the racket frame as usual. Where the honeycomb is disposed so that a side is exposed (as opposed to a facing sheet), the string pierces through the cell walls first, and then through the frame as usual. Because the ends of the string are encased in the honeycomb, the vibrations emanating from the playing surface of the string diaphragm are dampened before they reach the frame of the racket.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. Tear resistant, light weight vibration dampening filler for the hollow center of a generally cylindrical body forming the superstructure of sporting equipment comprising:

a core made from strips of thermoplastic elastomeric material compression bonded together to form the walls of a honeycomb network of generally hexagonally shaped cells, the walls of said cells each having upper edges and lower edges;

said core being planarized along said upper and lower edges of said core to form a body of expanded honeycomb; and an elongated block of said core being compacted and inserted within said hollow center of said cylindrical body and allowed to expand outwardly against the interior walls of said cylindrical body providing a vibration dampening interface.

2. Vibration dampening filler as recited in claim 1 further comprising a first sheet of resilient thermoplastic elastomeric facing material, thermal compression bonded to one of the upper and lower surfaces of said core formed by said upper and lower edges to form a body of singly faced core material.

3. Vibration dampening filler as recited in claim 2 further comprising a second sheet of resilient thermoplastic elastomeric facing material, thermal compression bonded to the unfaced surface of said core formed by said upper and lower edges, hermetically sealed to encapsulate air in said cells to form a body of doubly faced core material.

4. Vibration dampening filelr as recited in claim 1 wherein said cylindrical body is the handle portion of a sports racket.

5. Vibration dampening filler as recited in claim 1 wherein said cylindrical body is the handlebar portion of a bicycle.

6. Vibration dampening filler as recited in claim 1 wherein said cylindrical body is the handle portion of a ball game bat.

7. Vibration dampening filelr as recited in claim 1 wherein said cylindrical body is the handle portion of a sports club.

8. Vibration dampening filler as recited in claim 1 wherein said cylindrical body is a baseball bat.

9. Tear resistant, light weight vibration dampening filler for use within the hollow center of the throat portion of a tennis racket comprising:

a core made from strips of thermoplastic elastomeric material compression bonded together to form the walls of a honeycomb network of generally hexagonally shaped cells, the walls of said cells each having upper edges and lower edges;

said core being planarized along said upper and lower edges of said core to form a body of expanded honeycomb; and at least one elongated block of said core being compacted and inserted within said hollow center of said throat portion of said tennis racket and allowed to expand outwardly against the interior walls of said hollow throat, providing a vibration dampening interface.

10. In a tennis racket including a string diaphragm contained within a frame, a shaft attached to said frame and a handle attached to said shaft, an improved handle comprising:

a generally octagonal rod of rigid material, having first and second sides disposed parallel to the plane of said string diaphragm, said second side opposite to said first side, third and fourth sides disposed normal to said first and second sides and opposite to each other, a fifth side disposed diagonally between said first and fourth sides, a sixth side disposed diagonally between said fourth and second sides, a seventh side disposed diagonally between said second and third sides, an eighth side disposed diagonally between said third and first sides;

a first generally U-shaped channel disposed within said third side of said rod and extending the full length of said rod;

a second generally U-shaped channel disposed within said fourth side of said rod and extending the full length of said rod; and tear resistant, light weight vibration dampening filler having:

a core made from strips of thermoplastic elastomeric material compression bonded together to form the walls of a honeycomb network of generally hexagonally shaped cells, the walls of said cells each having upper edges and lower edges;

said core being planarized along said upper and lower edges of said core to form a body of expanded honeycomb;

wherein an elongated block of said vibration dampening filler is compacted and inserted within each of said first and second channels of said tennis racket, and allowed to expand outwardly against the interior walls of said channel to provide a vibration dampening interface.

11. An improved tennis racket handle as recited in claim 10 further including a third generally U-shaped channel disposed within said first side of said rod and extending the full length of said rod, and a fourth generally U-shaped channel disposed within said second side of said rod and extending the full length of said rod.

12. An improved tennis racket handle as recited in claim 10 wherein said core of vibration dampening filler further includes a first sheet of resilient thermoplastic elastomeric facing material, thermal compression bonded to one surface of said core formed by said upper and lower edges, to form a body of singly faced core material.

13. An improved tennis racket handle as recited in claim 12 wherein said core of vibration dampening filler further includes a second sheet of resilient thermoplastic elastomeric facing material, thermal compression bonded to the other surface of said honeycomb structured core, hermetically sealed to encapsulate air in said cells, thereby forming a body of doubly faced core material.

14. In a tennis racket including a string diaphragm contained within a frame, a shaft attached to said frame and a handle attached to said shaft, an improved frame comprising:

a generally elliptical ring of rigid material, said material being generally square shaped, having first and second sides disposed parallel to the plane of said string diaphragm, said second side opposite to said first side, third and fourth sides disposed normal to said first and second sides and opposite to each other, wherein said third side creates the inner wall of said ring and said fourth side creates the outer wall of said ring;

a generally U-shaped channel disposed within said third side of said ring, extending the full inner circumference of said ring; and tear resistant, light weight vibration dampening filler having:

a core made from strips of thermoplastic elastomeric material compression bonded together to form the walls of a honeycomb network of generally hexagonally shaped cells, the walls of said cells each having upper edges and lower edges;

said core being planarized along said upper and lower edges of said core to form a body of expanded honeycomb;

wherein an elongated block of said vibration dampening filler is inserted within said channel to provide a vibration dampening interface.

15. An improved tennis racket frame as recited in claim 14 wherein said core of vibration dampening filler further includes a first sheet of resilient thermoplastic elastomeric facing material, thermal compression bonded to one surface of said core formed by said upper and lower edges, to form a body of singly faced core material.

16. An improved tennis racket frame as recited in claim 15 wherein said core of vibration dampening filler further includes a second sheet of resilient thermoplastic elastomeric facing material, thermal compression bonded to the other surface of said honeycomb structured core, hermetically sealed to encapsulate air in said cells, thereby forming a body of doubly faced core material.

* * * * *